UNITED STATES PATENT OFFICE.

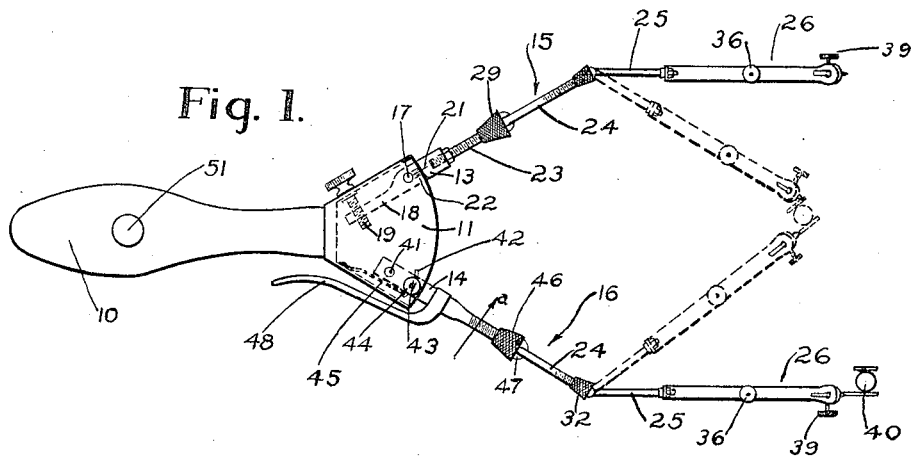

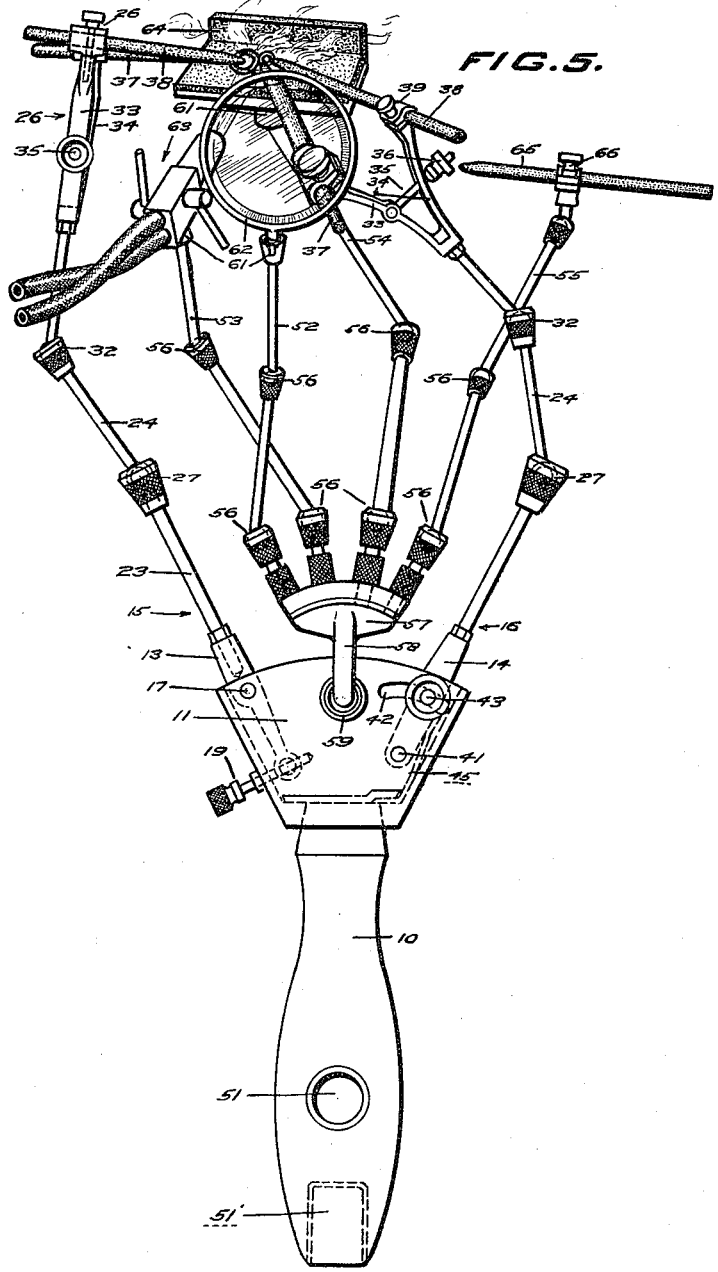

JULIUS C. OSHER, OF ANAHEIM, CALIFORNIA.

UNIVERSAL DENTIST'S AND JEWELER'S TOOL.

1,311,414.  Specification of Letters Patent.  Patented July 29, 1919.

Application filed October 1, 1917. Serial No. 194,267.

*To all whom it may concern:*

Be it known that I, JULIUS C. OSHER, a citizen of the United States, residing at Anaheim, in the county of Orange and State of California, have invented new and useful Improvements in Universal Dentists' and Jewelers' Tools, of which the following is a specification.

My object is to make a tool for handling light work such as that performed by dentists and jewelers, the tool having a single handle or base with a plurality of universally adjustable arms extending from the handle or base and carrying adjustable fingers.

The invention is illustrated, by way of example, in the accompanying drawings in which:

Figure 1 is a view in elevation illustrating the completely assembled holder and further disclosing by dotted lines one position of the arms during a soldering operation.

Fig. 2 is a view in side elevation illustrating the tool and particularly disclosing one of the clamping elements with which each of the arms is fitted.

Fig. 3 is an enlarged fragmentary view illustrating the adjustment provided the set arm.

Fig. 4 is an enlarged fragmentary view illustrating the double socket joint with which each of the arms is formed.

Fig. 5 is a view in side elevation illustrating another form of the invention and showing the application of the various elements during their operation.

Referring more particularly to the drawings, 10 indicates a handle which is formed of a suitable shape to allow the operator to readily grasp it. As here shown the handle has a pair of spaced fan-shaped plates 11 and 12 at one of its ends between which pivoted shanks 13 and 14 of adjusting arms 15 and 16 are disposed. The shank 13 is held between the plates by a pivot pin 17 which is mounted through the plates at a point adjacent the marginal edge thereof. This shank is formed with an extension 18 which projects between the plates and toward the handle. Near its end it is threaded to receive an adjusting screw 19. This screw in turn is rotatably held within a plate 20 which is formed as a part of the handle and is interposed between the plates 11 and 12. Due to the manner in which the adjusting screw 19 is mounted, it may be easily rotated to swing the shank 13 around its pivotal center 17. A graduating mark 21 is formed upon the shank near the edge of the plate 11 and may be brought to register with one of a series of graduations 22 formed upon the plate. It will thus be seen that this shank has a limited movement and for that reason the arm 15 of which it is a part will hereinafter be designated as the set arm, while the arm 16 will be called the swinging arm.

The set arm comprises the shank 13, a socket stem 23, a ball and socket stem 24, a ball stem 25, and a pair of clamping fingers 26. As particularly shown in Fig. 4, the socket stem 23 is exteriorly threaded throughout its length and is formed with a socket portion 27 adapted to receive a ball 28 formed upon one end of the ball and socket stem 24. A threaded sleeve 29 is mounted upon the stem 23 and is formed with a cupped counterbore within which the socket member 27 may be wedged, thus locking the socket 27 upon the ball 28. As before stated, the ball 28 is formed at one end of the ball and socket stem 24. The opposite end of this stem is formed with a socket 30 adapted to receive the ball end 31 of the ball stem 25. The stem 24 is also exteriorly threaded to receive a threaded clamping sleeve 32 which wedges around the socket 30 and clamps the ball stem 25 in any desired angular position in relation to the stem 24. The opposite end of the ball stem 25 is threaded and is provided with a shoulder and nut by which the fingers 26 are secured to the arm. It will be understood that the fingers may be of any suitable design. However, in the present instance, they are shown as having spring arms 33 and 34, which are adjustably held in relation to each other by an adjusting screw 35 and a thumb-nut 36. The screw 35 is pivotally secured to the arm 33 and extends through an opening in the arm 34 where it is engaged by the nut. Eyes are formed through the ends of the fingers through which clamping points 37 and 38 extend. These points are adjustably held in position through the eyes by adjusting screws 39 and assume a position in relation to each other as particularly shown in Fig. 2, and are preferably formed of slate or other suitable non-metallic refractory material. In this view a tooth band 40 is shown as held between the points.

The shank 14 of the arm 16 is pivotally secured between the handle plates 11 and 12 by a pivot pin 41 which is positioned from the end face of the plates a sufficient distance to allow the arm to have a considerable range of movement. An arcuate slot 42 is formed through the plate 11 and concentric with the pin 41 to receive a lock-screw 43 which extends from the shank 14 of the arm and through the slot. The outer end of this screw is provided with a thumb-nut 44 by which the arm may be locked in position when desired. Under normal conditions, however, this arm is free to move until the screw 43 is stopped in the end of the slot 42, it being held in this position by a leaf spring 45 which acts to swing the arm in the direction of the arrow —a— as shown in Fig. 1 of the drawings. The outer end portion of the shank 14 is threaded to receive a clamping sleeve 46 which is a duplicate of the sleeve 29 upon the opposite arm and is provided to clamp a socket member 27 around the ball 28 of another ball and socket stem 24, at the outer end of which is mounted a ball stem 25 secured by a sleeve 32. This ball stem is provided with a pair of fingers 26 identical in design and size with the fingers upon the arm 15. Thus duplicate clamping members are provided to hold separate pieces of material in universally adjustable positions in relation to each other.

A thumb-piece 48 is secured to the shank 14 of the arm 16 and extends downwardly along the handle. Pressure upon this piece will cause the arm 16 to swing outwardly and away from the arm 15, quickly separating the two arms, and when released will return to the set position.

Reference being had to Fig. 5, it will be seen that the handle 10 is fitted with the arms 15 and 16 previously described, as well as a magnifying glass arm 52, a Bunsen burner arm 53, a soldering tray arm 54, and a steadying arm 55. These arms are each formed with universal joints 56, the sockets of which are detachably secured to a base member 57. This member is formed with a shank 58 the end of which is ball-shaped and is mounted for universal movement in a socket 59 formed upon the plate 11 of the handle and intermediate the mountings of arms 15 and 16, thus making it possible for the four arms 52—55 inclusive to be simultaneously adjusted in relation to the arms 15 and 16.

The arms 52—55 inclusive are provided with intermediate universal joints 60 and end universal joints 61, each of which is constructed as the ball and socket joints previously described and may be individually locked to dispose the arm sections in any desired angular relation to each other. Universally mounted to the arm 52 by the joint 61 is a magnifying glass 62. Similarly mounted by the universal joint 61 to the arm 53 is a Bunsen burner or blow-torch 63. A soldering plate 64 is secured by a universal joint 61 to the outer end of the arm 54, while a clamping point 65 is mounted at the outer end of the arm 55. This point is similar to the points 37 and 38 previously described and may be brought to bear against the work to steady it. An adjustable clamp 66 is provided to hold the member 65. Similar clamps are used to hold the points 37 and 38 and permit the points to have a swinging action in relation to the fingers upon which they are mounted.

I call especial attention to the advantage of using slate pencils for the points 37 and 38. Good slate pencils are sufficiently strong for the purpose and may be readily ground to produce points of the desired form, that is, with one job the points may be flat and sharp like chisels, with another job these same points may be ground round like awls, and at one time the points may be in straight lines with the centers of the pencils and at another time they may be off-set to one side to any desired extent. I do not know of any other refractory material easily procured which answers the purpose so well.

In operation of the form of the device shown in Fig. 1, the shank 13 of arm 15 is set by means of the adjusting screw 19, after which a piece of material may be clamped between the points 37 and 38 within the fingers. Another piece may then be clamped between similar points upon the opposite pair of fingers and the two arms 15 and 16 thereafter adjusted to bring the pieces together in a desired relation to each other. The arm 16 may then be locked by the thumb-nut 44 and the soldering operation performed. In case it is desired, the tool holder may be mounted upon a shank 49 of a ring stand. This shank is shown in a fragmentary manner in Fig. 2 and there has a collar 50 which supports the tool when the upper portion of the shank extends through an opening 51 in the handle 10.

From the foregoing description the operation of the form of the device shown in Fig. 5 is evident.

Thus I have produced a tool especially adapted for handling the light work of dentists and jewelers, and comprising a single handle or base with a plurality of universally adjustable arms extending from the handle or base and each arm carrying a pair of adjustable fingers, there being means for securing each pair of fingers in adjusted positions relative to each other and there being means for securing each arm in its adjusted position.

It will thus be seen that the device here disclosed may be simply operated and universally adjusted to hold pieces of material in fixed relation to each other.

While I have shown the preferred construction of my universal dentist's and jeweler's tool-holder as now known to me, it will be understood that various changes in the combination, construction and arrangement of parts may be made by those skilled in the art without departing from the spirit of my invention as claimed.

I claim:

1. A tool comprising a handle, a pair of spaced fan-shaped plates extending rigidly from one end of the handle, a first and second shank pivotally mounted between the plates, an extension leading inwardly from the first shank, a set-screw for adjusting the extension, an adjustable arm connected to the first shank, a lock-screw carried by the second shank and extending through a slot in one of the plates for holding the second shank in an adjusted position, a leaf spring fixed between the plates and engaging the second shank to throw the outer end of the second shank inwardly, and an adjustable arm connected to the second shank.

2. A tool comprising a handle, a pair of spaced fan-shaped plates extending rigidly from one end of the handle, a first and second shank pivotally mounted between the plates, an extension leading inwardly from the first shank, a set-screw for adjusting the extension, an adjustable arm connected to the first shank, a lock-screw carried by the second shank and extending through a slot in one of the plates for holding the second shank in an adjusted position, a leaf spring fixed between the plates and engaging the second shank to throw the outer end of the second shank inwardly, an adjustable arm connected to the second shank, and a thumb-piece secured to the second shank and extending downwardly along the handle.

3. A tool comprising a handle, a pair of spaced fan-shaped plates rigidly secured to one end of the handle, shanks pivotally mounted between the plates, means for accurately adjusting the position of one shank, spring means for operating the other shank, universally adjustable arms extending from the shanks, a socket fixed upon one of the plates, a central shank having a ball mounted in the socket, a base member carried by the outer end of the central shank, and a plurality of adjustable arms extending from the base member.

In testimony whereof I have signed my name to this specification.

JULIUS C. OSHER.

Copies of this patent may be obtained for five cents each, by addressing the "Commissioner of Patents, Washington, D. C."